United States Patent [19]

McColl

[11] 4,205,730
[45] Jun. 3, 1980

[54] MOUNTING AND DRIVING MECHANISM FOR THE STEERABLE WHEELS OF A MULTI-WHEEL OFF-ROAD VEHICLE

[75] Inventor: Bruce J. McColl, Whitby, Canada

[73] Assignee: Owens-Illinois, Inc., Toledo, Ohio

[21] Appl. No.: 973,427

[22] Filed: Dec. 26, 1978

Related U.S. Application Data

[63] Continuation-in-part of Ser. No. 934,457, Aug. 17, 1978.

[51] Int. Cl.$^2$ ............................................. B60K 17/30
[52] U.S. Cl. ..................................... 180/261; 180/24; 180/24.13; 280/677
[58] Field of Search ................. 180/43 A, 43 B, 43 R, 180/44 E, 45, 51, 52, 79.1, 140, 24, 24.13; 280/91, 92, 677, 678

[56] References Cited

U.S. PATENT DOCUMENTS

| | | | |
|---|---|---|---|
| 2,456,865 | 12/1948 | Cottingham | 180/43 R |
| 2,661,069 | 12/1953 | Cooper | 180/52 |
| 3,027,959 | 4/1962 | Mailliard | 180/65 R |
| 3,244,249 | 4/1966 | Thomas | 180/14 |
| 3,280,931 | 10/1966 | Cahill et al. | 180/79.1 |
| 3,302,739 | 2/1967 | Beck et al. | 180/65 R |
| 3,874,698 | 4/1975 | Lee et al. | 280/408 |
| 4,089,384 | 5/1978 | Ehrenberg | 180/44 E |

Primary Examiner—John J. Love
Assistant Examiner—Donn McGiehan
Attorney, Agent, or Firm—John R. Nelson; Myron E. Click; David H. Wilson

[57] ABSTRACT

This invention relates to a mounting and driving mechanism for the steerable wheels of a multi-wheel, off-road vehicle of the type utilized for transporting long loads, such as trimmed tree trunks or whole trees, over roadless terrain. Such vehicles generally have front and rear quad-wheel assemblies pivotally connected to a centrally disposed elongated bed frame so as to permit lateral rotation of the quad-wheel assemblies about a roll axis disposed below and parallel to the longitudinal axis of the bed frame. Each quad-wheel assembly additionally includes a pair of walking beams which are respectively disposed in laterally spaced relationship with respect to the longitudinal bed frame and are pivotally mounted for rotation about a horizontal transverse axis. At each end of each walking beam, a wheel is mounted in a unique fashion together with individually controlled motors for respectively supplying traction power and steering movements to such wheel. A unique feature of the mounting and driving mechanism for each wheel is the fact that both the traction torque and the steering torque is transmitted to the wheel about a common axis provided in the wheel mounting housing.

4 Claims, 2 Drawing Figures

MOUNTING AND DRIVING MECHANISM FOR THE STEERABLE WHEELS OF A MULTI-WHEEL OFF-ROAD VEHICLE

CROSS REFERENCE TO RELATED APPLICATIONS

This application constitutes a continuation-in-part of my copending application Ser. No. 934,457 filed Aug. 17, 1978, which discloses a micro-processor system for controlling the wheels of a multi-wheel vehicle which have individually controlled traction motors and individually controlled steering actuators.

BACKGROUND OF THE INVENTION

Generally speaking, this invention relates to self-propelled vehicles used primarily to transport long loads across roadless terrain. More specifically, it relates to rubber-tired vehicles that have wheel suspension mechanisms which provide balanced weight distribution on its wheels and individually controlled motors for respectively applying traction power and steering torque to each such wheel, as well as an individually controlled brake for each wheel.

As described in my copending application, Ser. No. 934,458, filed Aug. 17, 1978, the mounting of each wheel of the quad wheel assembly was accomplished by an axle housing which is medially pivoted to the end of the walking beam. A motor driven linear actuator is then mounted between one end of the axle housing and a medial portion of the walking beam and provides steering movements of the axle housing about its pivot mounting axis. Thus, a triangular relationship is defined between the walking beam, axle housing and the steering actuator. A driving motor is mounted at another medial position on the axle housing and, by virtue of conventional gearing contained within the confines of the hollow axle housing, imparts traction torque to the particular wheel.

SUMMARY OF THE INVENTION

This invention constitutes an improved arrangement of the mounting, driving, and steering mechansim for the individual wheels of a multi-wheeled, off-road vehicle. In contrast to the structure disclosed in my aforementioned copending application Ser. No. 934,458, this invention does not employ a triangular relationship between the axle housing, the walking beam, and the steering actuator. Such arrangement, while very effective to produce the required steering movement about a relatively large radius, i.e. on the order of two to four feet, was subject to the disadvantage that rocks, stumps, or tree branches could become entrapped within the triangle defined by such members.

In accordance with the construction of this invention, an axle housing is provided which provides a hub-type mounting for a wheel on one end thereof, for rotational movements about a normally horizontal axis, and the other end is designed to be pivotally mounted in a housing mounted on the end of the walking beam for movements about a normally vertical axis. Both the traction motor and the steering motor are mounted on a top cover for such housing, thus providing an environmentally protected location for such relatively fragile elements. The torque required to impart traction power to the individual wheel as well as the torque required to effect steering movements of the wheel about the vertical axis defined by the mounting housing, are both transmitted by separate gearing mechanisms that are concentric with the axis of the mounting housing. There is, therefore, no opportunity for a tree limb or boulder to become wedged between elements of the steering mechanism and thus render it ineffective. Additionally, the mounting construction of this invention permits the utilization of either a planetary or harmonic type gear reduction unit to transmit steering torque from the motor that does not vary as a function of the angular steering position of the wheel.

Other advantages and objects of this invention will become apparent when the following description is read with reference to the accompanying drawings.

DESCRIPTION OF PREFERRED EMBODIMENT

Figure 1:
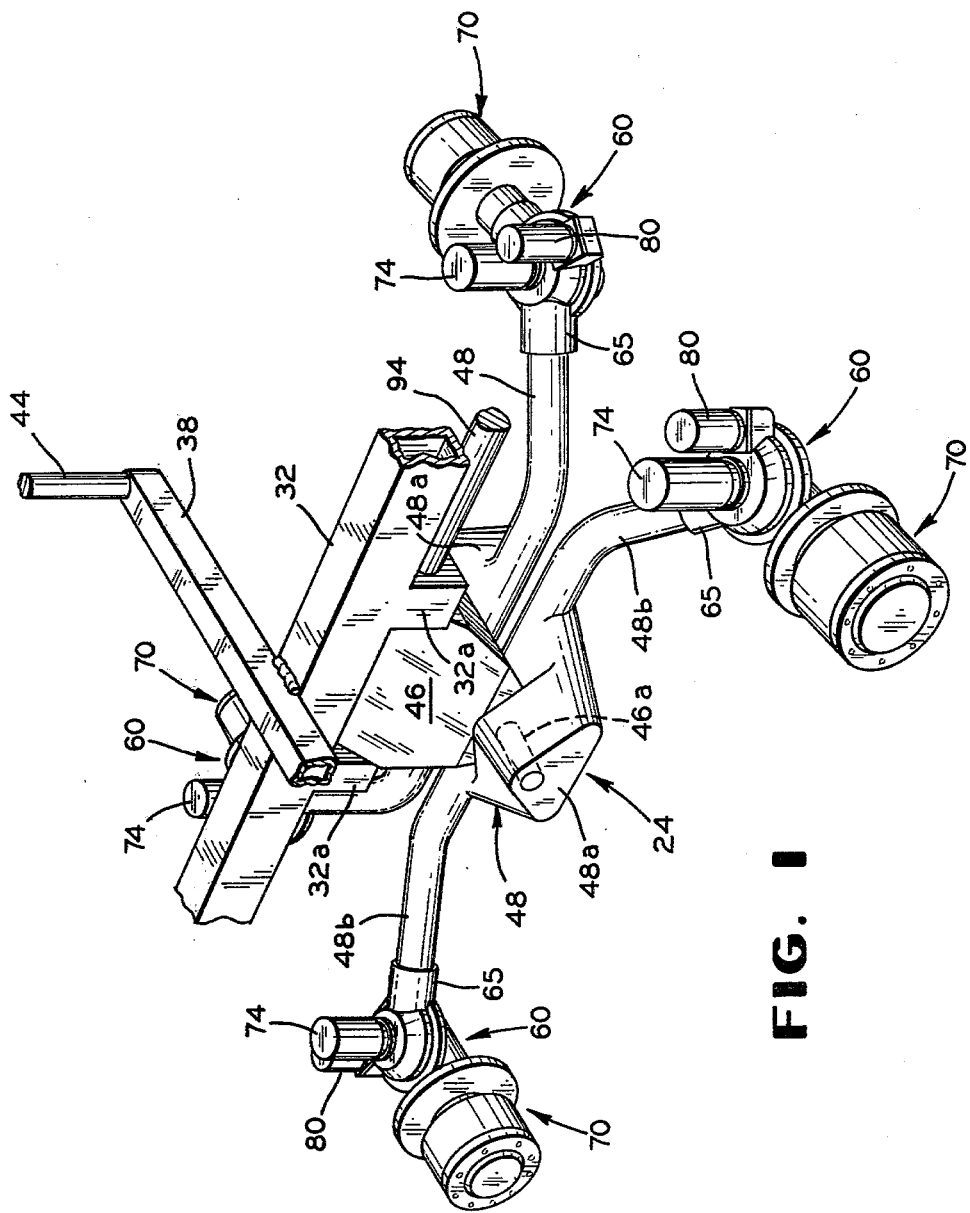
FIG. 1 is a perspective view of a portion of a multi-wheel, off-road vehicle, more specifically, the quad-wheel suspension mechanism for such vehicle.

As described in more detail in my aforementioned co-pending application, Ser. No. 934,457, filed Aug. 17, 1978, numeral 32 in FIG. 1 represents the main longitudinal frame element of a multi-wheel, off-road vehicle. The frame 32 which serves as a backbone of the vehicle may be a rectangular tube. A plurality of rigid cross beams 38 extend outwardly from the frame 32 in both directions to form load carrying cradles. Upright side stakes 44 may be provided on the outer ends of the cross beams 38. The stakes, along one or both sides, may be releasably mounted to permit sidewise dumping of the load on either side by appropriately tilting the bed frame element 32 about the roll axis of the quad-wheel suspension assembly to be hereinafter described. Two substantially identical quad-wheel assemblies 24 are provided in spaced relationship along the elongated bed frame 32, but only one is illustrated.

The suspension system for quad-wheel assembly 24 includes a main pivot block 46 which is pivotally suspended beneath the tubular bed frame 32 between a pair of depending blocks 32a, thus providing pivotal movement about a longitudinal, horizontal roll axis which is parallel to and slightly below the axis of the tubular bed frame 32. Such pivotal mounting is not shown but is entirely conventional. A torque transmission tube 94 extends rearwardly from the main pivot block 46 in the case of the front quad-wheel assembly, and forwardly from the main pivot block 46 in the case of the rear quad-wheel assembly, and each is co-movable with the respective pivot block about the vehicle roll axis. The adjacent ends of the tubes 94 are respectively interconnected by a roll control linkage mechanism (not shown) but which is fully described and illustrated in my aforementioned co-pending application.

The bottom portion of main pivot block 46 is provided with a pair of laterally projecting, horizontal pivot pins 46a which respectively provide pivotal mountings for a pair of walking beams 48, which are of identical configuration except that they are mounted in reversed positions on the pivot pins 46a. Each walking beam is of a generally truncated W-shaped configuration in plan view, including a central truncated inverted V-shaped portion 48a defining a bearing for pivotal mounting on pin 46a, and identical angularly disposed, tubular end elements 48b which provide mountings for steerable wheel mountings 60, there being a separate mounting for each wheel of the quad-wheel assemblies. The horizontal angle of walking beam elements 48b determines the maximum steering angle of each wheel relative to the suspension.

Figure 2:
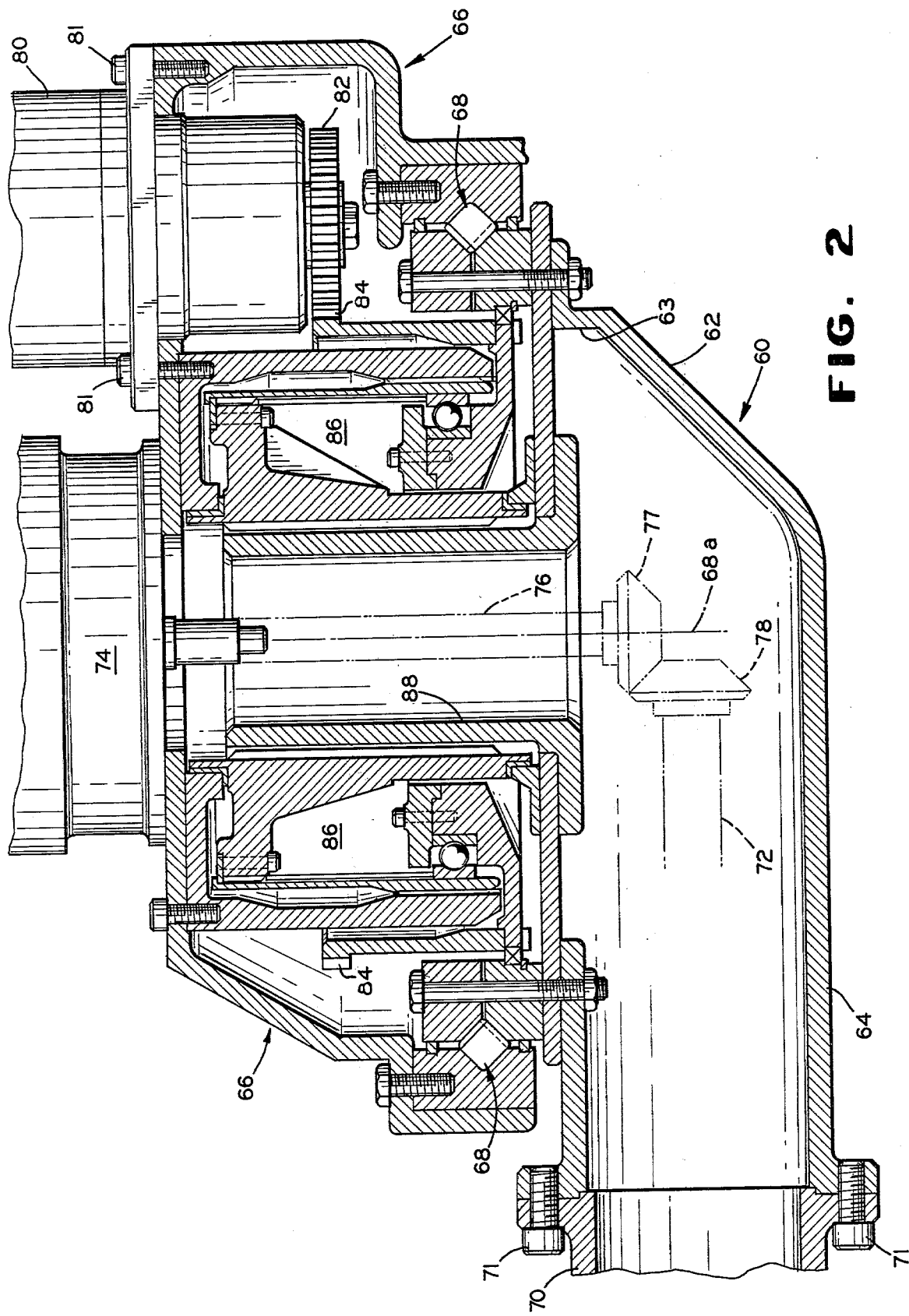
FIG. 2 is a partial sectional view taken on the plane 2—2 of FIG. 1.

Referring particularly to FIG. 2, each wheel mounting assembly 60 includes a main hollow housing 62 which defines an open top, vertical cylindrical chamber portion 63, and a radially extending axle housing portion 64 in communication therewith.

Immediately above the chamber 63, an inverted bowl shaped gear reduction housing cover 66 is pivotally mounted on the main housing 62 by a conventional anti-friction swing bearing unit 68. On one side of cover housing 66 an integral collar 65 (FIG. 1) is formed to permit the convenient rigid mounting of the cover housing 66 to the respective tubular end 48b of the walking beam 48. This permits the main housing 62 to freely pivot about the vertical axis 68a of bearing 68 to provide steering movements for the axle housing portion 64 of such housing.

On the end of axle housing portion 64 there is mounted a wheel mounting hub member 70, as by bolts 71, and the hub member 70 not only provides for conventional mounting of a large ground engaging wheel (not shown) on its periphery, but also within such hub mounts a conventional planetary transmission for driving such wheel at reduced speed from a drive shaft 72 which is axially disposed within the hub 70 and the axle housing 64. The steering radius of each wheel is on the order of two to four feet.

A hydraulic or electric steering motor 80 is suitable mounted on the top of the gear reduction housing 66 as by bolts 81 and the output shaft (not shown) of such motor mounts a pinion gear 82 which engages a ring gear 84 concentrically mounted on the periphery of a speed reduction unit 86 for rotation about steering axis 68a.

Speed reduction unit 86 will not be described in detail inasmuch as it comprises either a compound planetary gear unit of the type well known in the art or a harmonic type gear reduction unit similar to those manufactured and sold by the Gear Systems Division of U. S. M. Corporation of Wakefield, Mass. Such harmonic drive reduction units are fully described and illustrated in a Designers Manual published by the aforesaid Gear Systems Division of U. S. M. Corporation. In any event, regardless of whether a compound planetary gear reduction system or a harmonic drive unit is employed, the output sleeve 88 thereof is connected to housing 62 and a significant reduction in speed, on the order of 1000 to 1, is effected between the steering drive motor 80 and the main housing 62, permitting such main housing 62 and hence the connected hub housing to be slowly turned about the axis 68a of the power drive shaft 71.

Traction motors 74 and steering motors 80 are individually controlled by suitable circuitry, for example, by the control system described in my said co-pending application Ser. No. 934,457.

From the foregoing description, it is apparent that this invention provides an unusually compact, yet economical construction for effecting the transmission of the relatively large torque required for producing both the rotational or motive power torque to be applied to each wheel of a multi-wheel, off-road vehicle but also applies adequate torque to effect the turning of such wheels about the same axis as the motive power is transmitted to the wheel from the traction motor.

Modifications of this invention will be obvious to those skilled in the art, and it is intended that the scope of the invention be determined solely by the appended claims.

I claim:

1. A wheel suspension mechanism for an off-road vehicle comprising, in combination:
    (a) a walking beam adapted for pivotal mounting to the vehicle about a normally horizontal transverse axis, each end of said walking beam having an outwardly angled arm portion terminating in a hollow, generally circular power transmission housing having a normally vertical axis;
    (b) an elongated hollow axle housing having one end thereof journalled in said power transmission housing for pivotal movement about said vertical axis, and means on the other end of said axle housing for mounting a wheel for rotation about (the longitudinal axis of said axle housing) a normally horizontal axis;
    (c) a first motor mounted on said housing and having a drive shaft concentrically disposed relative to the axis of said transmission housing;
    (d) gearing means within said transmission housing and said axle housing connecting said drive shaft with said wheel mounting means, thereby applying traction power to the vehicle wheel;
    (e) a second motor mounted on said transmission housing, and
    (f) speed reduction means mounted in said transmission housing connecting said second motor and said one end of said axle housing to pivot said axle housing about said (power transmission) vertical axis, whereby steering movements may be selectively imparted to said wheel.

2. The combination defined in claim 1 wherein said speed reduction means comprises a planetary gear system having an output gear connected to said one end of said axle housing.

3. The combination defined in claim 1 wherein said speed reduction means comprises a harmonic drive having a rotary output member connected to said one end of said axle housing.

4. A wheel suspension mechanism for an off-road vehicle comprising, in combination:
    (a) a walking beam adapted for pivotal mounting to the vehicle about a normally horizontal transverse axis, each end of said walking beam having an outwardly angled arm portion terminating in a hollow, generally circular power transmission housing having a normally vertical axis;
    (b) an elongated hollow axle housing having a first end thereof journalled in said power transmission housing for pivotal movement about said vertical axis, and means on the other end of said axle housing for mounting a wheel for rotation about a normally horizontal axis;
    (c) a drive shaft concentrically disposed relative said vertical axis of said transmission housing and a first power means for rotating said drive shaft;
    (d) drive transmission means connecting said drive shaft with said wheel mounting means, thereby applying traction power to the vehicle wheel;
    (e) a second power means, and
    (f) speed reduction means connecting said second power means to said one end portion of said axle housing to pivot said axle housing about said vertical axis, whereby steering movements may be selectively imparted to said wheel.

* * * * *

UNITED STATES PATENT AND TRADEMARK OFFICE
CERTIFICATE OF CORRECTION

PATENT NO. : 4,205,730

DATED : June 3, 1980

INVENTOR(S) : Bruce J. McColl

It is certified that error appears in the above-identified patent and that said Letters Patent are hereby corrected as shown below:

Claim 1 should read as follows:

1. A wheel suspension mechanism for an off-road vehicle comprising, in combination:
   (a) a walking beam adapted for pivotal mounting to the vehicle about a normally horizontal transverse axis, each end of said walking beam having an outwardly angled arm portion terminating in a hollow, generally circular power transmission housing having a normally vertical axis;
   (b) an elongated hollow axle housing having one end thereof journalled in said power transmission housing for pivotal movement about said vertical axis, and means on the other end of said axle housing for mounting a wheel for rotation about a normally horizontal axis;
   (c) a first motor mounted on said housing and having a drive shaft concentrically disposed relative to the axis of said transmission housing;

UNITED STATES PATENT AND TRADEMARK OFFICE
CERTIFICATE OF CORRECTION

PATENT NO. : 4,205,730

DATED : June 3, 1980

INVENTOR(S) : Bruce J. McColl

It is certified that error appears in the above-identified patent and that said Letters Patent are hereby corrected as shown below:

(d) gearing means within said transmission housing and said axle housing connecting said drive shaft with said wheel mounting means, thereby applying traction power to the vehicle wheel;

(e) a second motor mounted on said transmission housing; and (f) speed reduction means mounted in said transmission housing connecting said second motor and said one end of said axle housing to pivot said axle housing about said vertical axis, whereby steering movements may be selectively imparted to said wheel.

Signed and Sealed this

Third Day of February 1981

[SEAL]

Attest:

RENE D. TEGTMEYER

Attesting Officer

Acting Commissioner of Patents and Trademarks